United States Patent
Hüsten et al.

[15] 3,652,141
[45] Mar. 28, 1972

[54] COMBINED THREE-SECTIONAL AXIAL-RADIAL ROLLER TURNING CONNECTION

[72] Inventors: Werner Hüsten, Hellinghausen; Heinrich Siemensmeyer, Dortmund-Brunninghausen, both of Germany

[73] Assignee: Hoesch Aktiengesellschaft, Dortmund, Germany

[22] Filed: Nov. 27, 1970

[21] Appl. No.: 93,219

[30] Foreign Application Priority Data

Nov. 28, 1969 Germany ...................... P 19 59 710.5

[52] U.S. Cl. ............................................................ 308/174
[51] Int. Cl. ............................................................ F16c 19/14
[58] Field of Search ................................ 308/230, 234, 174

[56] References Cited

FOREIGN PATENTS OR APPLICATIONS 31,203   9/1964   Germany ............................. 308/230

Primary Examiner—Edgar W. Geoghegan
Assistant Examiner—Frank Susko
Attorney—Walter Becker

[57] ABSTRACT

A three-sectional combined axial-radial antifriction journaling system, in which an outer ring with an inwardly extending flange has by means of antifriction elements such as axial rollers journaled therein a two-sectional inner ring which is additionally journaled on said flange by means of radial antifriction elements such as rollers, the cage for said axial rollers being slidably supported by inner peripheral surfaces of said outer ring and by outer peripheral surfaces of said outer ring and by outer peripheral surfaces of said inner ring.

5 Claims, 6 Drawing Figures

INVENTORS:
Werner Hüsten
Heinrich Siemensmeyer
By

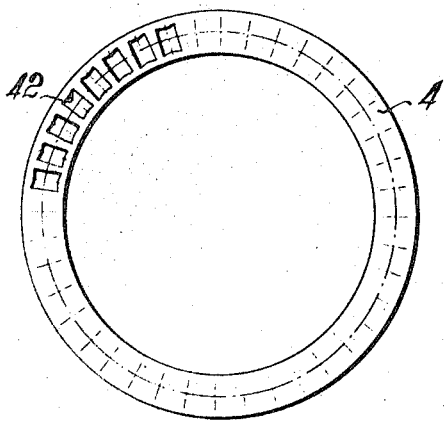
FIG. 2a
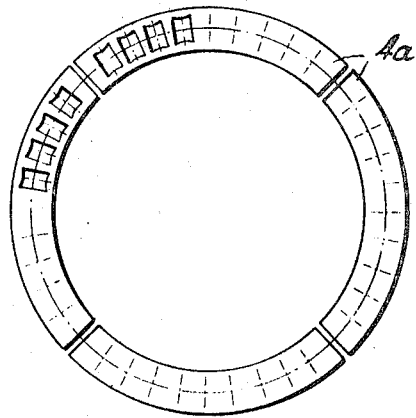
FIG. 2b
FIG. 3
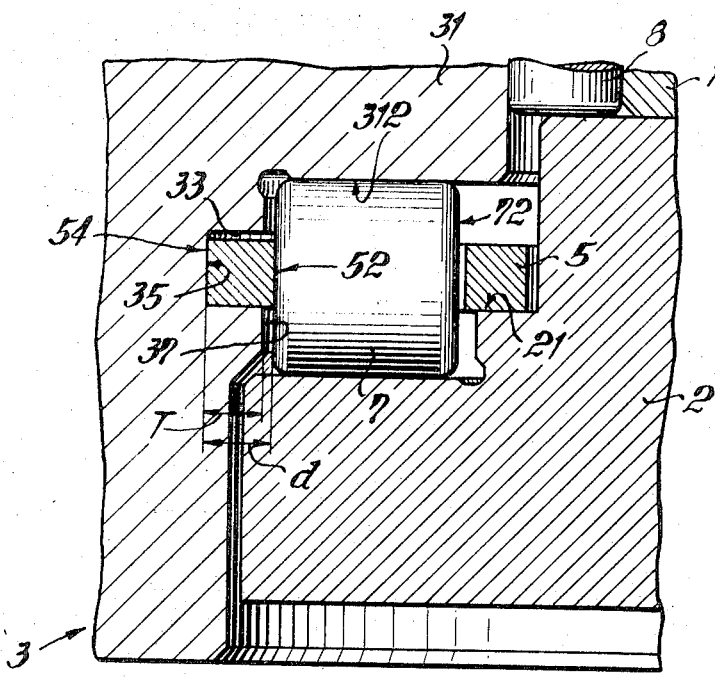
INVENTORS:
Werner Hüsten
Heinrich Siemensmeyer
By Walter Becker

COMBINED THREE-SECTIONAL AXIAL-RADIAL ROLLER TURNING CONNECTION

The present invention relates to a combined three-sectional axial-radial roller turning connection which comprises a one-sectional outer ring with a protruding central portion, and a two-sectional inner ring forming an upper and lower ring, according to which the rows of axial rollers are equipped with edge guided (bordgeführten) rollers.

Roller bearings with edge guided rollers and window cages are known, according to which the openings for receiving the rollers are, in most instances, milled. The air in the pocket is, in most instances, of such magnitude that the cage is not carried by the rollers, and thus is not roller guided, but instead slides on the roller path and on the inner and outer edge surfaces. For small bearings, also a so-called meander cage is employed. For larger bearings and high speeds, this cage is not suitable, inasmuch as it is liable easily to deform.

It is, therefore, an object of the present invention to provide a roller turning connection in which the cage, which is preferably made by a punching process is guided neither by rollers nor contacts the roller path or roller tread, and additionally will assure a uniform introduction of guiding forces.

These objects and other objects and advantages of the invention will appear more clearly from the following specification, in connection with the accompanying drawings, in which.

FIGS. 2a and 2b respectively show a unitary and a multi-sectional cage for the journaling system according to the invention.

Figure 1:
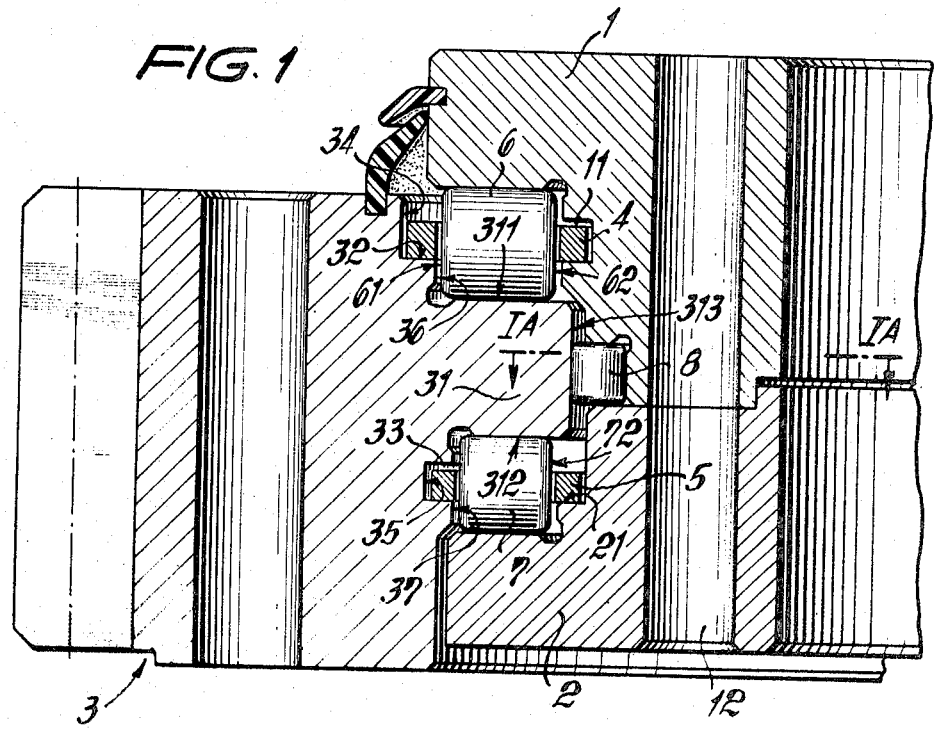
FIG. 1 illustrates a longitudinal section through a combined three-sectional axial-radial journaling system according to the invention.
Figure 1A:
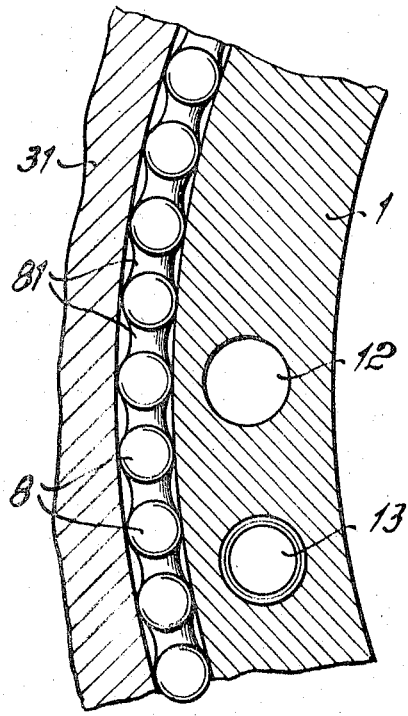
FIG. 1A is a section taken along the line 1A—1A of FIG. 1.

FIG. 3 illustrates on a larger scale than FIG. 1, an axial roller in its end position.

The axial radial roller turning connection or journaling system according to the invention is characterized primarily in that adjacent the protruding central portion of the outer ring on one of its sides there is provided a saddle whereas the other side has a groove. At the same level as said saddle and said groove there is provided a groove corresponding to said saddle which guides the cages precisely along the longitudinal axis of the axial rollers while in the lower ring pertaining to the inner ring there is provided a saddle corresponding to the said groove.

The cages guided in the grooves and on the saddles are designed as window flat cages in the form of segments. The race surfaces of the cage windows are convexly arched and have a play with regard to the diameter and the length of the axial rollers. The ends of said cage surfaces are rounded.

The distance between the outer surface of the cage and the zenith of the convexly arched race surfaces is, according to a further feature greater than the depth of the supporting surface supporting the cage.

Referring now to the drawings in detail, the arrangement shown therein comprises a one-piece outer ring 3, which together with a two-sectional inner ring forms a roller turning connection, said inner ring comprising an upper ring 1 and a lower ring 2. Outer ring 3 has a protruding central portion 31 pointing toward the inner ring. Those surfaces of this central portion 31 which are arranged in spaced relationship and parallel to each other and the end face therebetween serve as race surfaces 311, 312, 313, for the axial rollers 6, 7 and the radial roller 8 respectively.

The base body of the outer ring 3 has recesses adjacent to the two sides of the central portion 31, and more specifically, on one side has a turned-out portion forming a saddle or annular step 32 and on the other side has an annular groove 33. Corresponding to these recesses of the outer ring 3 there are provided recesses in the upper ring 1 and in the lower ring 2. More specifically, the saddle 32 has associated therewith in the outer ring 3, groove 11 located in the upper ring 1, whereas the groove 33 in the outer ring 3 has associated therewith a saddle 21 which is located in the lower ring 2. Loosely placed upon these recesses—saddle and groove—are cages 4, 5, which guide axial rollers 6, 7, said cages being adapted to slide on said axial rollers. Thus, the cages 4, 5, in contrast to heretofore known arrangements do not slide on a portion of the race surfaces so that by this feature the danger of a wear of these race surface parts caused by the sliding of the cages 4, 5 will not occur. It is rather assured that the cages 4, 5, also with increased load will, within the race surfaces, always remain maintained in a plane shape and will not cause any undesired deformations. The cages 4, 5, are designed as window flat cages of segmental shape.

The grooves 11, 33 and the saddles 21, 32 are so arranged that the cages 4, 5, are guided precisely along the antifriction bearing center so that it will be assured that the guiding forces are uniformly introduced.

Figure 2:
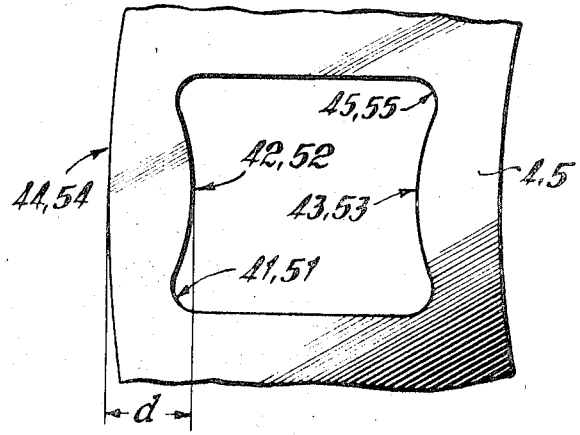
FIG. 2 shows on a larger scale than FIG. 1 a top view of a portion of the uppermost cage of FIG. 1.

Inasmuch as the illustration of FIG. 2 corresponds to the design of the cage 4 as well as to the design of cage 5, an additional illustration of cage 5 has been omitted and the reference numerals referring to cage 5 have been inserted in FIG. 2 in parentheses.

The axial rollers 6, 7, merely contact the inner surfaces of the cage windows 41, 51. The race surfaces 42, 43, 52, 53 of the cage windows 41, 51 are convexly designed so that the proportion of the sliding friction between the axial rollers 6, 7 and the cages 4, 5 is minor. The cage windows 41, 51 are engaged by the end faces 61, 62; 71, 72 of the axial rollers 6, 7.

When the outer surfaces 44, 54 (FIG. 2) of the cages 4, 5 engage the vertical surfaces 34, 35 of the outer ring 3, and when simultaneously the outer end faces 61, 71 of the axial rollers 6, 7 engage the outer convexly arched race surfaces 42, 52 of the cage window 41, 51, it will be appreciated that between the outer end faces 61, 71 of the axial rollers 6, 7 and the border surfaces 36, 37 there will always be sufficient distance because the distance between the outer surface 44, 54 of cage 4, 5 and the zenith of the convexly arched running surfaces 42, 52 is greater than the depth of the engaging surface which supports the cage 4, 5. A continuous contact between the border surfaces 36, 37 with the outer end faces 61, 71 of the axial rollers 6, 7 would lead to a gradual destruction of said border surfaces 36, 37.

For purposes of manufacturing the cages 4, 5 in segmental shape for which advantageously the material under the name "St 37" is employed, also other materials as, for instance, brass, synthetic material, or similar materials, may be employed. When employing "St 37," the cages which may have a thickness of 12 millimeters are expediently punched or burned. The surfaces forming the confinement of the cage windows 41, 51 merge with each other through rounded portions 45, 55 serving as grease pockets.

As will be seen from the above, the arrangement according to the present invention has, in particular, the advantage that the cages no longer slide on the race surfaces for the axial rollers and the end faces of the axial rollers. In view of this simple construction of the cages, which may be produced by punching, or burning, and in cooperation with a minor portion of sliding friction, a safe operation is assured. Also, the reduction of the sliding portion of the outer and inner surface of the cages on the outer and inner border surface of the bearing rings by a strong decrease in the height of the cage is greatly advantageous. The said reduction in the height of the cage results in a decreases of the resistance of the bearing against rotation.

In view of the convexly arched inner surface 42,52 of the cage 4, 5 respectively and in view of the difference between the depth gauge T of the supporting surface for the cage and the distance d between the outer surface of the cage and the zenith of the convexly arched surface 42, 52, hollow chambers are formed, which advantageously serve as lubricating pockets.

It is, of course, to be understood that the present invention is, by no means, limited to the particular showing in the drawings, but also comprises any modifications within the scope of the appended claims.

What we claim is:

1. A three-sectional combined axial-radial antifriction journaling system, which includes a one-piece outer ring, the inner periphery of which comprises a radially inwardly extending circular flange spaced from the end faces of said outer ring in axial direction of said outer ring, axially opposite sides of said flange forming race ways, first and second antifriction means adapted respectively to roll on said race ways and together therewith forming part of antifriction bearing means, the inner peripheral surface of said flange forming an additional race way, third antifriction means adapted to roll on said additional race way and together with the latter forming part of radial antifriction bearing means, sectional inner ring means having portions arranged within said one-piece outer ring and comprising a first ring and a second ring substantially coaxial with said outer ring, first and second cage means respectively embracing said first and second antifriction means for guiding the same, the inner peripheral surface of said outer ring at one side of said circular flange being provided with a substantially circular step slidably supporting and guiding said first cage means, the inner peripheral surface of said outer ring at the other side of said annular flange being provided with a substantially circular groove slidably supporting and guiding said second cage means, and said inner ring means in the region of said first cage means being provided with a substantially circular groove slidably engaging and supporting said first cage means, and said inner ring means in the region of said second cage means being provided with a substantially annular step slidably supporting and guiding said second cage means.

2. A journaling system according to claim 1, in which said first and second rings define cage sections for receiving and guiding said third antifriction means.

3. A journaling system according to claim 1, in which said cage means includes a relatively thin disc with a plurality of substantially circumferentially evenly distributed cutouts forming windows respectively receiving said antifriction means therein, each of said windows having two oppositely located sides arched toward each other for guiding engagement with adjacent surfaces of said antifriction means, each of said windows embracing the respective antifriction means with play.

4. A journaling system according to claim 3, in which each of said windows in addition to said arched sides has two oppositely located substantially plane sides connected to said arched sides by rounded portions.

5. A journaling system according to claim 3, in which the radial distance between the outer peripheral surface of said disc forming said cage means and the apex of the respective adjacent arched side is greater than the height of the depth gauge of the outer ring surface supporting said cage means.

* * * * *